May 3, 1955
L. C. WILLIAMSEN
2,707,654
TOWING TRUCK WITH DETACHABLE DUMP BODY
Filed June 24, 1952
2 Sheets-Sheet 1
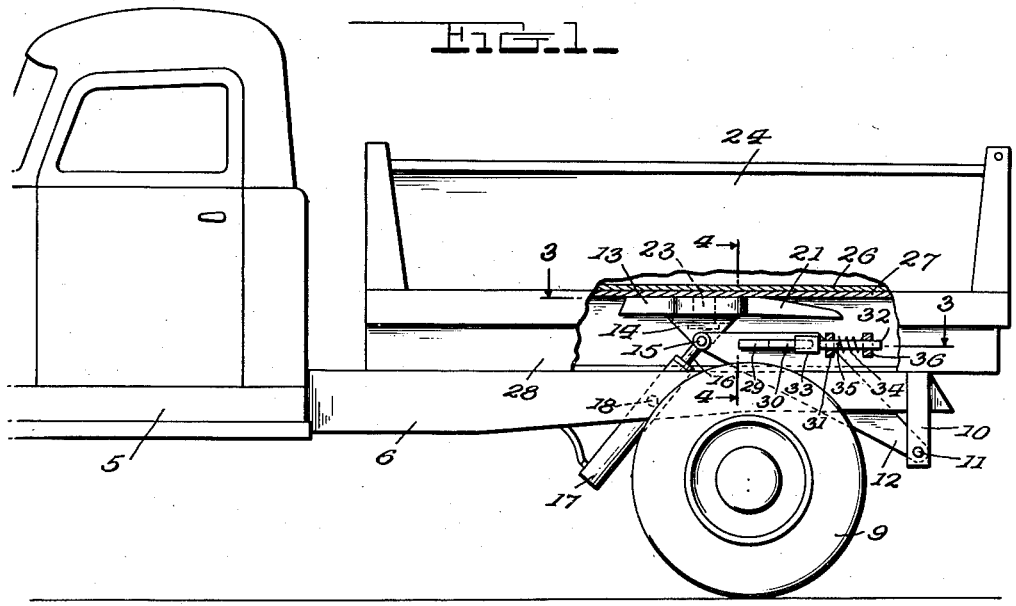
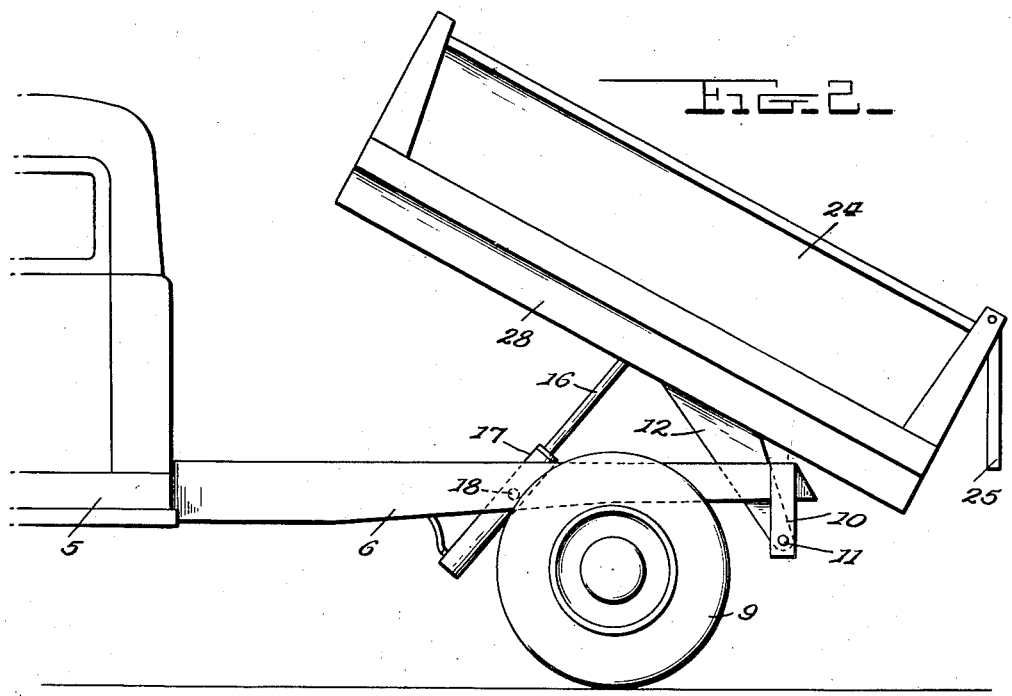
INVENTOR
L. C. Williamsen
BY
ATTORNEYS May 3, 1955 L. C. WILLIAMSEN 2,707,654
TOWING TRUCK WITH DETACHABLE DUMP BODY
Filed June 24, 1952 2 Sheets-Sheet 2
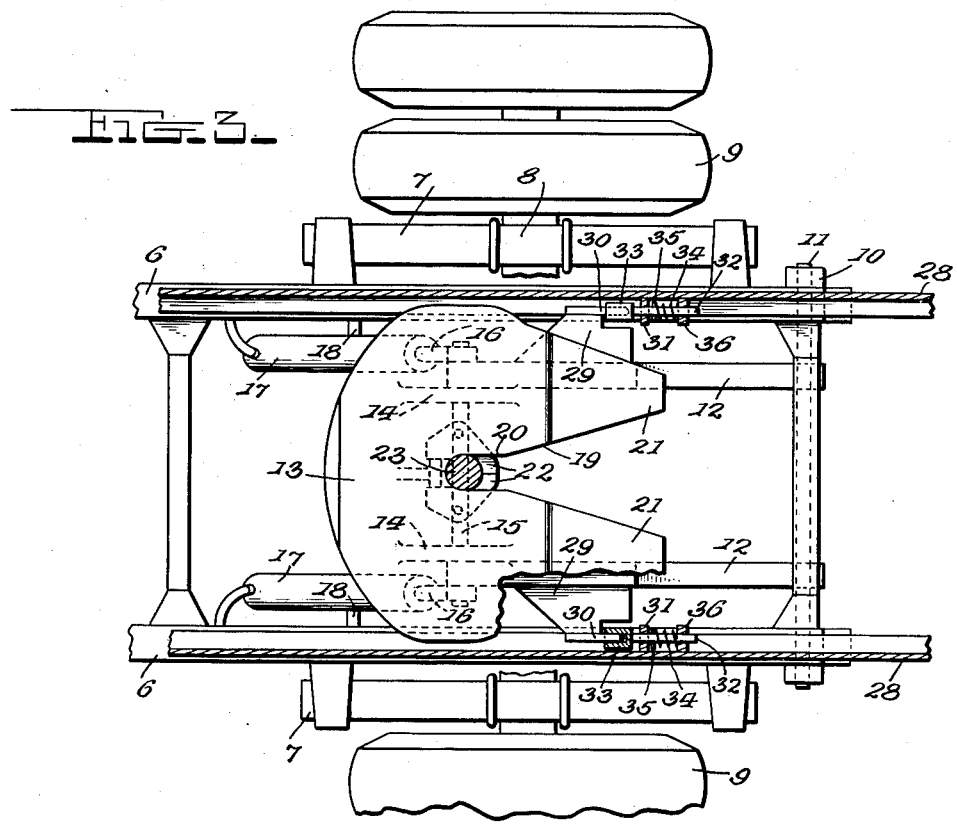
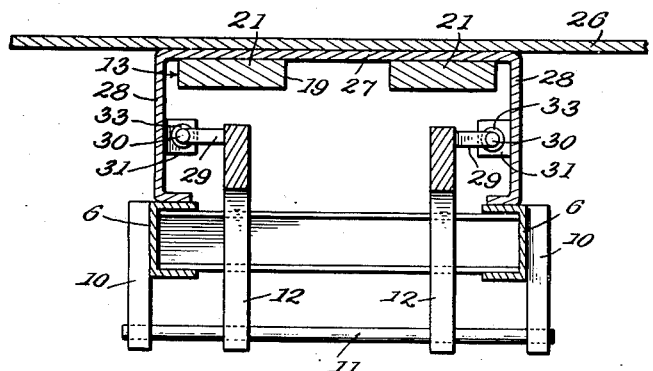
INVENTOR
L. C. Williamsen
BY
ATTORNEYS 2,707,654
Patented May 3, 1955

2,707,654
TOWING TRUCK WITH DETACHABLE DUMP BODY

Leland Clair Williamsen, Ogden, Utah, assignor to Williamsen Body & Equipment Co., Ogden, Utah Application June 24, 1952, Serial No. 295,191

5 Claims. (Cl. 298—22)

The following specification relates to novel improvements in a towing truck with detachable dump body. More specifically, it deals with increasing the usefulness of the towing truck ordinarily used with a semi-trailer. Such trucks are primarily intended solely for the hauling of the load-carrying semi-trailer and are not directly useable for other purposes.

It is the purpose of my invention to increase the usefulness of a towing truck by equipping it to serve for other work in addition to merely the towing of semi-trailers.

It is a further object of my invention to adapt a towing truck to carry a dump truck when it is not engaged in hauling a semi-trailer.

Among the objects of my invention is to provide means by which the fifth wheel or platform of the towing truck may be utilized for holding a load-carrying wagon body in fixed position during all phases of its use.

Among the objects of my invention is to provide means to restrain the fifth wheel member or platform from any lateral rocking movement while it carries the dump body.

In addition it is an object of my invention to provide means for "spotting" semi-trailers without requiring the operator to leave his driving position. Thus the truck is backed under the semi-trailer and the hydraulic fifth wheel is raised to lift the trailer off its standing legs into position for hauling, all by the driver at his seat. The trailer, when relocated, may also in this manner be lowered to standing position and the truck disconnected and moved away without the driver leaving his seat.

These and other objects of the invention will be indicated by the following description of the preferred form of my invention as illustrated in the accompanying drawings in which:

Fig. 1 is a side elevation, with parts broken away to show the improved towing truck with removable dump body;

Fig. 2 is a side elevation of the vehicle in elevated or dumping position;

Fig. 3 is a horizontal section taken on the line 3—3 of Fig. 1 to show the mode of attachment of the parts and Fig. 4 is a vertical transverse sectional view taken on the line 4—4 of Fig. 1.

Briefly described, the invention consists in providing the customary truck tractor, or towing truck, with a removable dump body. The parts are held together rigidly. The dump body is adequately supported on the side frame members of the tractor or truck during the load-carrying operation. When it is intended to discharge the load through the tail-gate of the dump body, the fifth wheel platform is brought into play, serving to elevate the dump body and tilt it backward.

As shown in the drawings, a truck tractor or towing truck 5 is provided of the customary form. It includes the side frames 6, 6 of the chassis which are spring-mounted as at 7, 7 over the rear axle 8 and its wheels 9, 9.

Each frame member 6 has a dependent hanger 10 at the rear end. The lower ends of the hangers 10 are connected by a transverse rock shaft 11.

Two parallel links 12, 12 are loosely carried at their rear ends on the rock shaft 11.

These links 12, 12 extend forwardly and upward to support a fifth wheel platform or plate 13. This platform 13 has a pair of spaced brackets 14, 14 extending downwardly as shown in Fig. 1. Brackets 14, 14 are connected by a transverse pivot shaft 15.

The ends of the pivot shaft carry piston rods 16, 16 which slide longitudinally in two spaced hydraulic cylinders 17, 17. The cylinders 17, 17 in turn are pivotally mounted as shown at 18 on the inner faces of the side frame members 6, 6.

The platform 13 has a longitudinal slot 19 with a central socket 20 arranged in the usual manner, as shown in Fig. 3. The rear portion of the platform is formed with diverging shoes 21, 21.

A pair of latching jaws 22 are separately pivoted on the underside of the platform 13. Customary means are provided for actuating these jaws to retain the usual coupling member or kingpin 23.

The open dump body 24 is of the usual type having a tail gate 25. The bottom 26 of the body 24 carries the coupling member or kingpin 23. In this way the body may be slid forwardly with the coupling member 23 between the shoes 21, 21 until the member is located in the slot 19 and engaged by the jaws 22.

The dump body has a bottom 26 which is supported on the underbody 27. It is this underbody which rests upon the platform 13 as shown in Figs. 1 and 4. The underbody 27 has downwardly extending channels or flanges 28, 28 at the sides. The lower edges of these channels rest on the side frame members 6, 6 as shown in Fig. 4.

The parallel links 12, 12 have outwardly extending webs or flanges 29, 29. These extend to the rear and have pins 30, 30.

Each channel 28 on its inner side has a pair of slide bearings 31 and 36. These slide bearings support a bar 32. A socket 33 forms the forward part of each bar 32.

An expansion spring 34 is carried by each bar 32. The spring is anchored in front at 35 and abuts the rear member 36 of the slide bearings.

When the dump body is slid forward over the platform 13, the sockets 33, 33 fit over the pins 30, 30. Thus the side channels of the dump body are anchored to the links 12, 12 against vertical movement except when raised by the piston rods 16, 16. In this manner, each link 12 forms an anchor for the corresponding side of the dump truck.

The respective sides of the dump truck are held down by the engagement between the pins 30 and the sockets 33. The latter also resist lateral rocking when the dump truck is raised and tilted backwardly for discharge of its load through the tail-gate.

By the above arrangement, the tractor or towing truck when disengaged from the semi-trailer, can be given maximum usefulness for hauling material in the dump truck. It is therefore possible to keep the tractor in operation continuously even while disconnected from the semi-trailer. The adaptation of the dump body to the fifth wheel mechanism of the towing truck is done by the simple addition of the webs and pins and without material change.

While the preferred form of the invention has been illustrated and described, it is to be understood that this is by way of example only, and that the invention is limited in scope only by the terms of the following claims.

What I claim is:

1. In combination with a truck tractor having a fifth wheel platform and extensible mechanism mounted on the tractor and pivotally connected to said platform for elevating and tilting the latter, of a dump body wholly supported on the tractor, a king-pin depending from the dump body for engagement with the platform, and holding means on the elevating mechanism for engaging the dump body and preventing its rotation relative to the platform.

2. In combination with a truck tractor having a fifth wheel platform mounted on pivoted parallel links and a pair of elevating rams mounted on the tractor and pivotally connected to said platform, a rearwardly directed pin carried on each link, a dump body wholly supported on the tractor, having side frame members and a depending central king-pin for latching engagement with said platform, and socket members on the frame members for receiving the said pins.

3. In combination with a truck tractor having a fifth wheel platform mounted on pivoted laterally spaced parallel links and a pair of elevating rams mounted on the tractor and pivotally connected to said platform, a flange mounted on the outer side of each link, a rearwardly directed pin carried on each flange, a dump body having side frame members and a depending central king-pin for latching engagement with said platform, and socket members on the frame members for receiving the said pins.

4. In combination with a truck tractor having a fifth wheel platform mounted on pivoted laterally spaced parallel links and a pair of elevating rams mounted on the tractor and pivotally connected to said platform, a rearwardly directed pin carried on each link, a dump body having side frame members and a depending central king-pin for latching engagement with said platform, bearings on said frame members, and socket members in the bearings for receiving the said pins.

5. In combination with a truck tractor having a fifth wheel platform mounted on pivoted laterally spaced parallel links and a pair of elevating rams mounted on the tractor and pivotally connected to said platform, a rearwardly directed pin carried on each link, a dump body having side frame members and a depending central king-pin for latching engagement with said platform, slide bearings on said frame members, socket members in the bearings for receiving the said pins and springs holding the socket members normally in advanced position.

References Cited in the file of this patent

UNITED STATES PATENTS

| 2,151,640 | Menning | Mar. 21, 1939 |
| 2,522,385 | Lindsay | Sept. 12, 1950 |